(12) United States Patent
Roper et al.

(10) Patent No.: US 9,528,776 B1
(45) Date of Patent: Dec. 27, 2016

(54) MICRO-ARCHITECTED MATERIALS FOR HEAT EXCHANGER APPLICATIONS

(71) Applicant: HRL Laboratories, LLC, Malibu, CA (US)

(72) Inventors: Christopher S. Roper, Santa Monica, CA (US); William B. Carter, Calabasas, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 702 days.

(21) Appl. No.: 14/041,042

(22) Filed: Sep. 30, 2013

Related U.S. Application Data

(62) Division of application No. 12/506,014, filed on Jul. 20, 2009, now Pat. No. 8,573,289.

(51) Int. Cl.
*F28F 9/00* (2006.01)

(52) U.S. Cl.
CPC ...................................... *F28F 9/00* (2013.01)

(58) Field of Classification Search
CPC ...... F28F 21/06; F28F 2260/00; F41H 5/0414; F28D 15/04; F28D 15/046; B29C 67/007; H05K 1/024; H05K 7/20336
See application file for complete search history.

(56) References Cited

U.S. PATENT DOCUMENTS

| | | | | |
|---|---|---|---|---|
| 7,424,967 B2* | 9/2008 | Ervin | ....................... | A47J 36/02 228/181 |
| 8,247,333 B2* | 8/2012 | Sypeck | ..................... | B32B 5/26 156/60 |
| 2002/0170941 A1* | 11/2002 | Wallach | ................ | B21F 27/128 228/170 |
| 2004/0123980 A1* | 7/2004 | Queheillalt | ........... | C23C 14/046 165/133 |
| 2005/0202206 A1* | 9/2005 | Wadley | ................. | E04C 2/3405 428/116 |
| 2006/0080835 A1* | 4/2006 | Kooistra | .............. | B21D 31/043 29/897.34 |
| 2010/0300669 A1* | 12/2010 | Jacobsen | ............... | F28F 13/003 165/185 |

* cited by examiner

*Primary Examiner* — Tho V Duong
(74) *Attorney, Agent, or Firm* — George R. Rapacki; Albert T. Wu

(57) ABSTRACT

A method of exchanging heat between fluids with a heat Exchanger comprising a three-dimensional ordered microstructure material within a shell. The three-dimensional ordered microstructure material has dimensions that allow for large surface area to volume ratios, between 300 and 15000 $m^2/m^3$. Alternatively the three-dimensional ordered microstructure may have an open volume fraction between 0.4 and 0.6. The three-dimensional ordered microstructure may be comprised of hollow truss elements and partially filled with a thermally conductive material or a fluid. The Heat Exchanger has a heat transfer coefficient multiplied by the surface area to volume ratio between $3.7*10^7$ and $7*10^9$ Watts per $M^3K$.

6 Claims, 15 Drawing Sheets

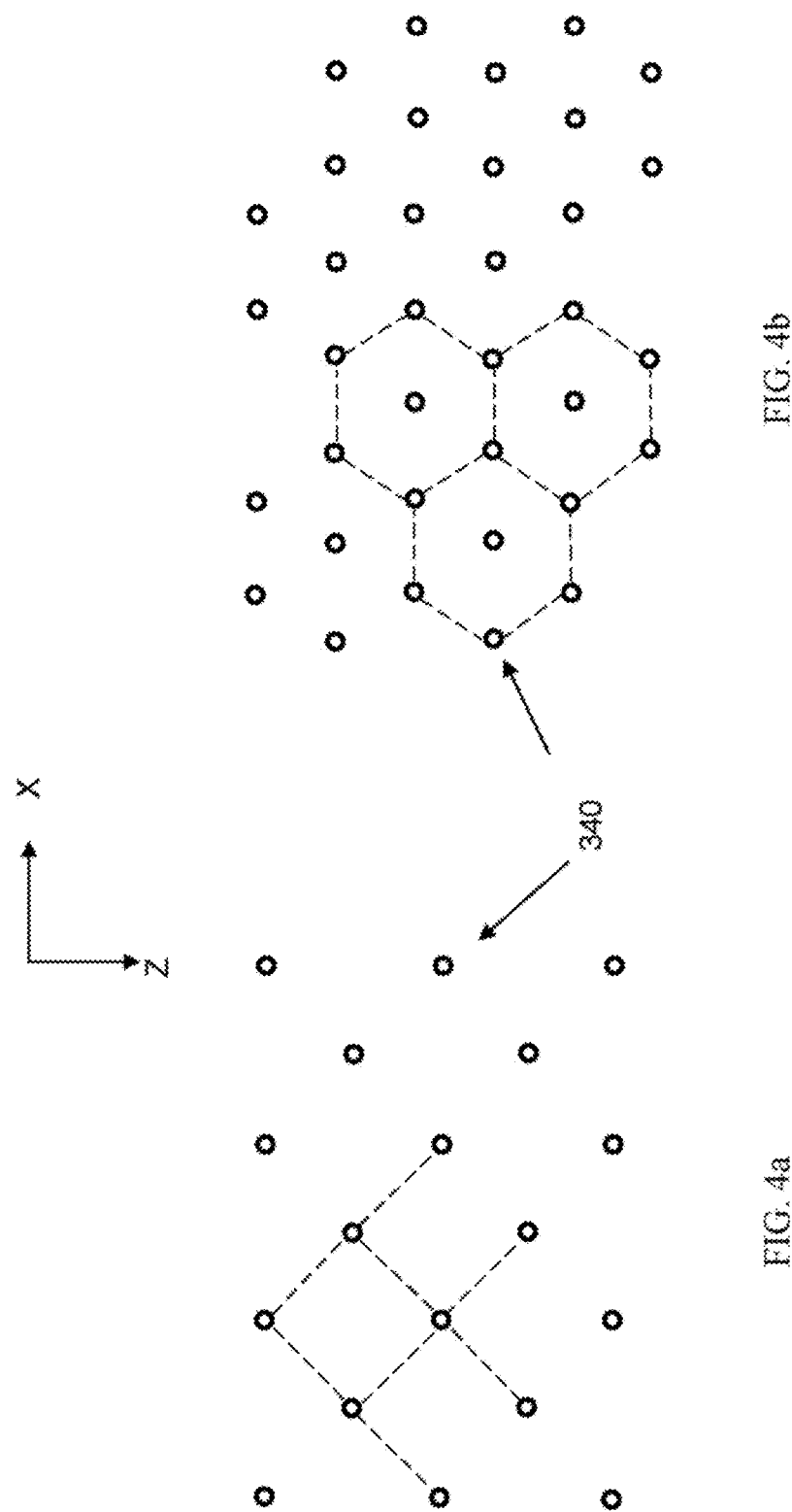

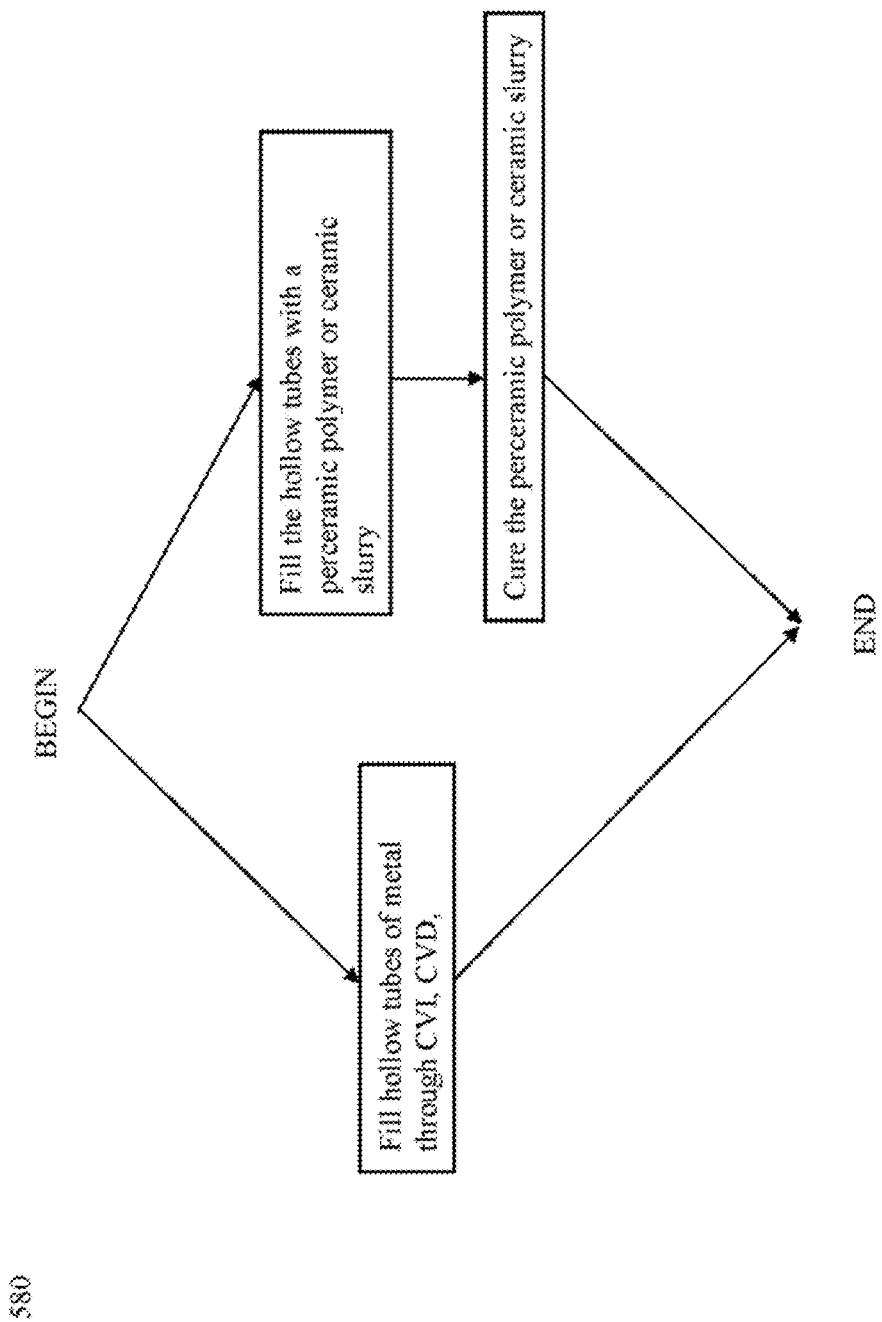

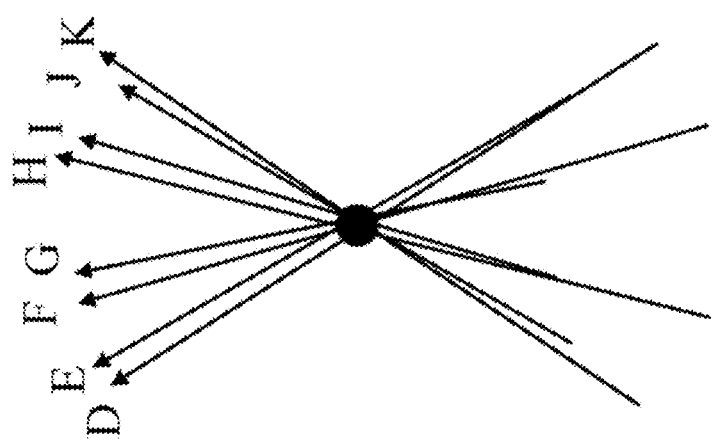

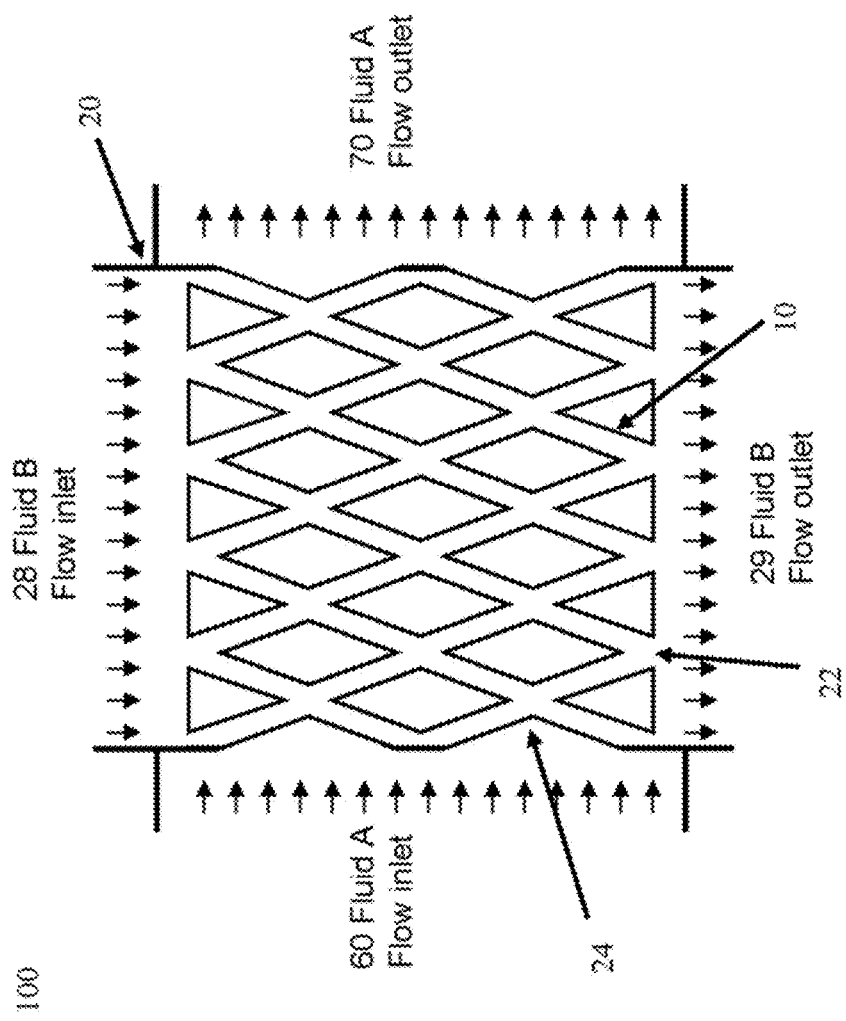

US 9,528,776 B1

MICRO-ARCHITECTED MATERIALS FOR HEAT EXCHANGER APPLICATIONS

RELATED APPLICATIONS

This application is a divisional application and claim priority to U.S. Ser. No. 12/506,014 filed Jul. 20, 2009 titled "MICRO-ARCHITECTED MATERIALS FOR HEAT EXCHANGER APPLICATIONS"

FIELD OF THE INVENTION

The present invention relates to the area of Heat Exchangers using conduction and or convection, and in particular, Heat Exchangers capable of supporting mechanical loads.

BACKGROUND OF THE INVENTION

Heat Exchangers transfer heat from a hot area to a cooler area through conduction and convection. Certain forms of Heat Exchangers use tubes within a shell. Other designs may use heat pipes.

For a given amount of heat to transfer there is usually a minimum size of Heat Exchanger. In general, if more heat has to be transferred then a larger Heat Exchanger is needed or one that is more efficient. The amount of heat that may be transferred is the heat transfer coefficient multiplied by the surface area to volume ratio. Another figure of merit for the Heat Exchanger is the pressure drop across the inlet and outlet of a flow through a Heat Exchanger. A typical shell and tube Heat Exchanger has a heat transfer coefficient multiplied by the surface area to volume ratio of $10^4$ to $10^6$ Watts/M$^3$K where K is the temperature in degrees Kelvin. The corresponding pressure drop is $10^{-3}$ to 10 Pascals per meter of length. If the surface area to volume ratio is increased then a given Heat Exchanger can transfer more heat for a given size.

In some applications, where the Heat Exchanger also has to support a mechanical load, the Heat Exchanger is simply built large enough for the amount of heat to transfer. When the Heat Exchanger design is constrained by the amount of heat to transfer, the physical size of the Heat Exchanger and the structural requirements of the exchanger, then alternatives are needed. The problem of exchanging a given amount of heat energy in a Heat Exchanger of a given size is solved, at least partially, by using a Heat Exchanger with a greater than typical surface area to volume ratio.

The problem is further complicated if the Heat Exchanger has to support mechanical loads. But this problem may be solved by using a Heat Exchanger with an internal structure, such as a truss structure, capable of supporting mechanical loads as well as having a large surface area to volume ratio.

The use of a truss architecture for active cooling has been reported in literature (for instance, Lu, Valdevit, Evans, "Active cooling by metallic sandwich structures with periodic cores", Progress in Materials Science 50 (2005) 789-815), incorporated by reference in its entirety. However, the only fabrication methods described are expensive, limited to a single truss layer, and limited to large truss unit cell sizes.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length.

Tian, Wadley, et al. (in "The effects of topology upon fluid-flow and heat-transfer within cellular copper structures", International Journal of Heat and Mass Transfer volume 47, issues 14-16, July 2004, p. 3171-3186) have experimentally investigated copper ordered cellular materials as heat sinks. The structures described therein are constrained to simple, flat geometries, do not have enhancements for increased convective heat transport, and are not designed to satisfy multiple functions (e.g. structural function in addition to heat transfer function).

As such, there is a need for Heat Exchangers that can support a mechanical load and that have a high surface area to volume ratio, as well as being economical to manufacture.

SUMMARY OF THE INVENTION

A Heat Exchanger device comprising a shell and a three-dimensional ordered microstructure material comprising a plurality of intersecting truss elements within the shell; wherein said truss elements interpenetrate each other at a plurality of nodes to form a continuous material; wherein the three-dimensional ordered microstructure material has a node to node spacing between 10 micrometers and 5 millimeters; and said plurality of truss elements have a diameter between 1 micrometer and 5 millimeters. The truss elements of the ordered microstructure material may intersect at an angle less than 90 degrees.

The three-dimensional ordered microstructure material of the Heat Exchanger device may comprise a plurality of layers, where each layer may comprise a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction.

The three-dimensional ordered microstructure material of the Heat Exchanger device may comprises a metal material or a ceramic material, the truss elements may be solid, hollow or filled with a fluid to form a heat pipe. Furthermore, the three-dimensional ordered microstructure material may have an open volume fraction between about 0.4 and 0.6; or a surface area to volume ratio between about 300 and 15000 m$^2$/m$^3$. The layers of the three-dimensional ordered microstructure material may have different open volume fractions. The Heat Exchanger device may have a heat transfer coefficient multiplied by the surface area to volume ratio between 3.7*$10^7$ and 7*$10^9$ Watts per M$^3$K.

A method of exchanging heat between two fluids, the method comprising receiving a first fluid in a first input port of the heat exchanger and receiving a second fluid in a second input port of the heat exchanger, wherein the Heat Exchanger device comprises a three-dimensional ordered microstructure material and a shell. The three dimensional ordered microstructure material further comprises a plurality of truss elements intersecting at a plurality of nodes to form a continuous material, the three-dimensional ordered microstructure material has a node to node spacing between 10 micrometers and 5 millimeters; and the plurality of truss elements have a diameter between 1 micrometer and 5 millimeters. The Heat Exchanger may have a heat transfer coefficient multiplied by the surface area to volume ratio between $3.7*10^7$ and $7*10^9$ Watts per $M^3K$.

The three-dimensional ordered microstructure material may have a surface area to volume ratio between about 300 and 15000 $m^2/m^3$, or an open volume fraction between about 0.4 and 0.6. Furthermore the three-dimensional ordered microstructure material may be comprised of a plurality of layers having different open volume fractions.

BRIEF DESCRIPTION OF THE DRAWINGS

The accompanying drawings, together with the specification, illustrate exemplary embodiments of the present invention, and, together with the description, serve to explain the principles of the present invention.

FIG. 1 may be thought of as defining a single cell of the microstructure.

FIG. 2 shows multiple unit cells arranged in layers to form a Heat Exchanger structure.

FIG. 4a illustrates an example of a square mask pattern (or a square mask aperture pattern) according to embodiments of the present invention. The dotted lines are fictional to aid the reader is seeing the pattern of squares.

FIG. 4b illustrates an example of a hexagonal mask pattern (or a hexagonal mask aperture pattern) according to embodiments of the present invention. The dotted lines are fictional to aid the reader is seeing the pattern of hexagons.

FIGS. 5A to 5E illustrate the process flow diagram for forming a Heat Exchanger with one or more polymer waveguide structures according to an embodiment of the present invention.

FIG. 6 is a perspective schematic view showing respective directions along which truss elements of a structure of an embodiment of the present invention may extend.

FIG. 7 illustrates an embodiment of a Heat Exchanger using microtruss material.

FIG. 11 illustrates spatially graded microtruss structures. FIG. 11B shows a spatially graded microtruss with the layers distinct in that they do not interpenetrate while

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

In the context of embodiments of the present invention, a three-dimensional ordered microstructure is referred to as an ordered three-dimensional structure at the micrometer scale, microstructure or as microtruss. In one embodiment of the present invention, a Heat Exchanger composed of a three-dimensional ordered microstructure is provided with hollow truss members. Here, the Heat Exchanger transfers heat from one fluid to another fluid through conduction and/or convection.

An alternative embodiment of the Heat Exchanger utilizes a microstructure with solid truss members.

The microstructure may be comprised of one or more layers of microstructure truss members. A layer is characterized and defined by the substantially identical dimensions of the truss elements, the substantially uniform node-to-node spacing and the substantially uniform included angle between intersecting truss elements. The layers may be formed in one process or several, concurrently or consecutively. The microstructure layers may be from separate processes and layered after the individual layers have completely formed. Individual layers may be held together through soldering, brazing, welding, using adhesives or other methods known in the art for mechanically or chemically bonding materials.

Figure 1:
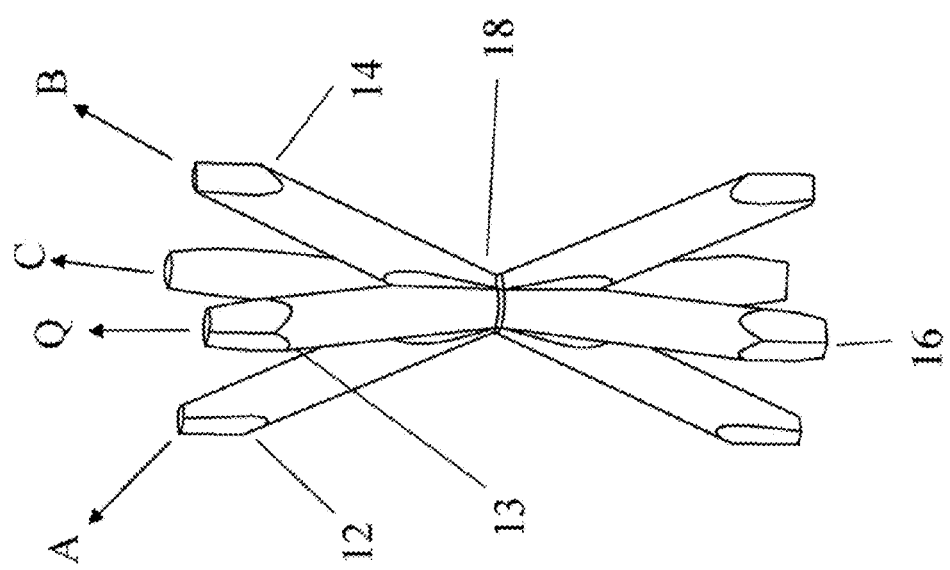
FIG. 1 is a perspective schematic view of a portion of a structure according to an embodiment of the present invention.
Figure 2:
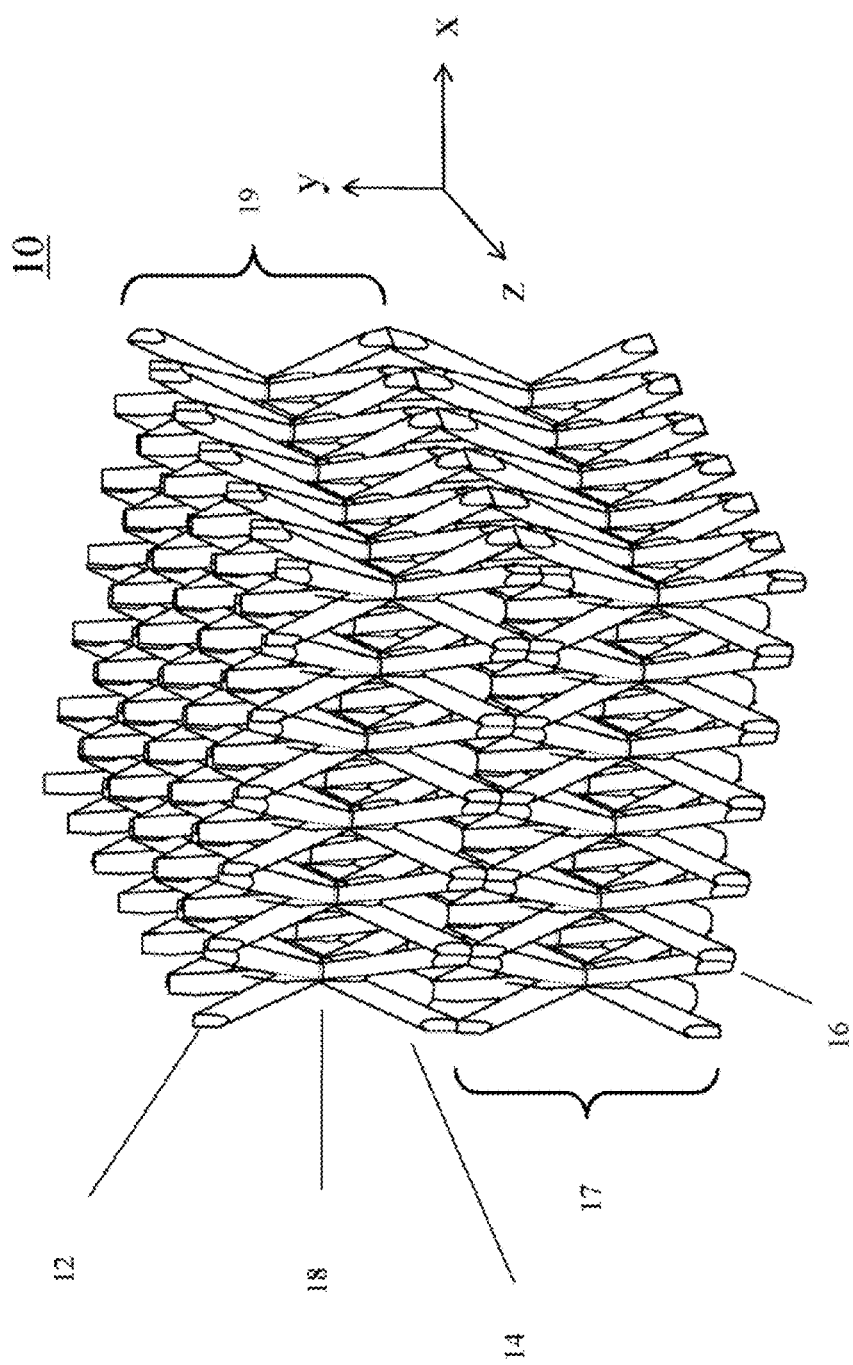
FIG. 2 is a perspective schematic view of a structure according to an embodiment of the present invention.

Referring to FIGS. 1 and 2, a three-dimensional ordered microstructure 10 according to an embodiment of the present invention is a self-supporting structure composed of a number of unit cells as shown in FIG. 1, interconnected as shown in FIG. 2. Note that while FIG. 2 shows the three-dimensional ordered microstructure in two layers 17 and 19, this is not meant as a limitation. A preferred embodiment of the present invention comprises a three-dimensional ordered microstructure comprising several layers 17 in the "y" direction. In one embodiment of the present invention, this three-dimensional ordered microstructure 10 can be utilized as a three-dimensional ordered microstructure to define (or derive) the final shape and dimensions of a Heat Exchanger that conforms to a particular shape. The microstructure 10 includes first truss elements 12, second truss elements 13, third truss elements 14, and optional fourth truss element 16. The first truss elements 12 are defined by first self-propagating polymer waveguides and extend along a first direction A. The second truss elements 13 are defined by second self-propagating polymer waveguides and extend along a second direction Q. The third truss elements 14 are defined by third self-propagating polymer waveguides and extend along a third direction B. The optional fourth truss elements 16 are defined by fourth self-propagating waveguides and extend along a fourth direction C. The first, second, third and optionally fourth ordered truss elements are coupled at a plurality of nodes 18 unperturbed by changes in index of refraction caused by photopolymerization of the first, second, third or fourth self-propagating polymer waveguides and defined by waveguide intersections of the first, second, third and optionally fourth self-propagating polymer waveguides.

With reference to FIGS. 1 and 2, the truss elements 12, 13, 14, 16 interpenetrate each other at nodes 18 to form a continuous material with a three-dimensional microstructure order. While four truss elements have been shown and described, this is not meant to imply any limitation. The skilled person in the art would realize that a three-dimensional ordered microstructure may be built of unit cells comprising three, four, five or more truss elements.

In one embodiment, the truss elements 12, 13, 14, 16 comprise a photo-polymer material. In one embodiment, the truss elements 12, 13, 14, 16 are polymer optical waveguide truss elements.

In one embodiment, each truss element is continuously formed such that it lacks interior boundaries; that is, no boundaries within the interpenetrating portions of truss elements 12, 13, 14, 16. As a result, the truss elements are solid and may extend through multiple layers.

According to one embodiment of the present invention, the microstructure 10 is formed by using a fixed light input (collimated UV light) to cure (polymerize) polymer optical waveguides, which can self-propagate in a 3D pattern. As such, the propagated polymer optical waveguides form the microstructure 10.

The length of a microtruss element is determined by the ability of the light to polymerize the liquid monomer. That ability is determined by the monomer itself and the power of the light used to polymerize the monomer. For any given monomer and light intensity there is a finite distance over which the waveguide will propagate. Larger distances may be obtained with more energetic light or different monomers but in general the structure will be limited in at least one dimension. This length may be greater than the length between nodes along a truss element. As disclosed in Monro et al. "Topical Review Catching Light In Its Own Trap," Journal Of Modern Optics, 2001, Vol. 48, No. 2, 191-238, fibers may be formed as long as 1 cm.

According to one embodiment of the present invention, a mask with a two-dimensional pattern of apertures (see FIG. 3) is used to create a three-dimensional polymer microstructure (or a polymer microtruss structure).

Figure 3:
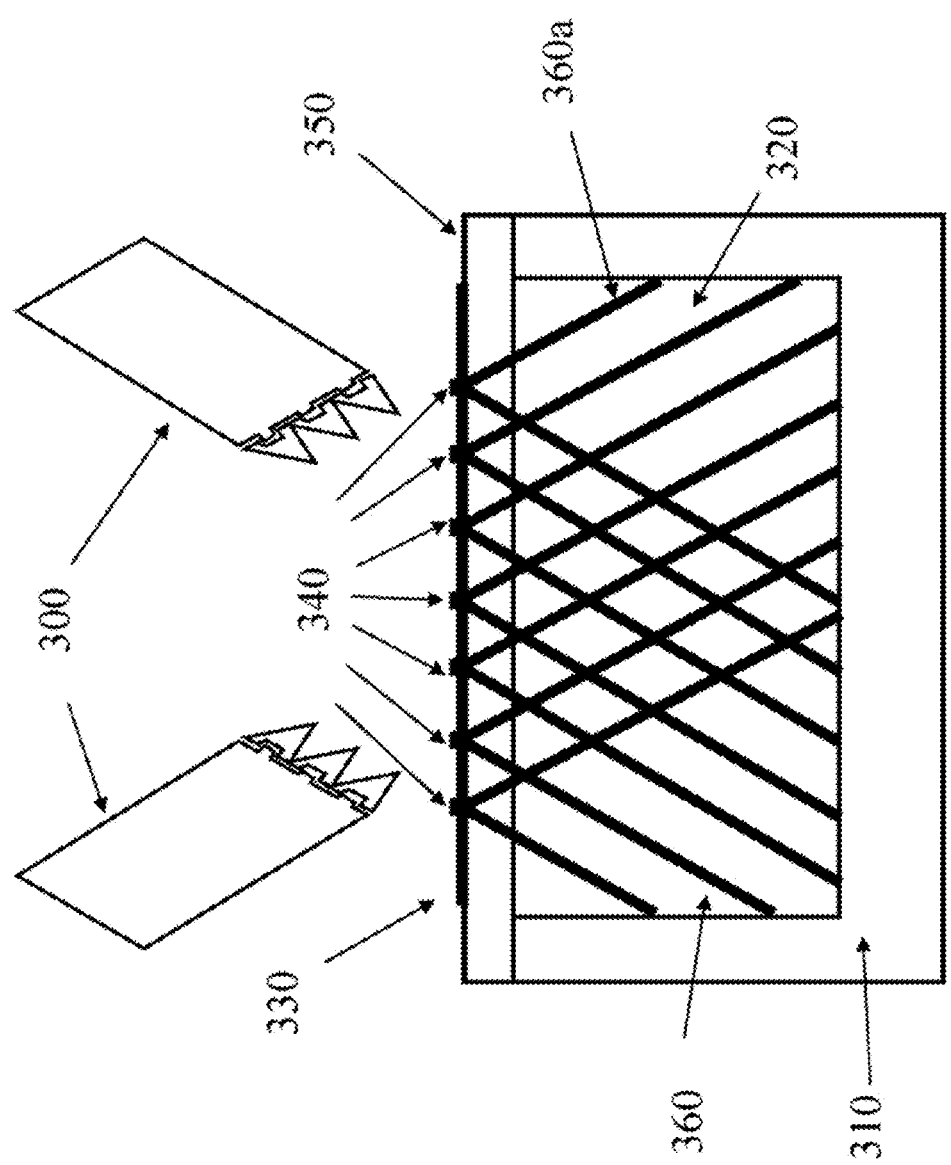
FIG. 3 is a schematic diagram of a system for forming a structure of an embodiment of the present invention from multiple waveguides created using a single collimated beam or multiple collimated beams through multiple apertures.

With reference to FIG. 3, a system for forming a three-dimensional polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross-section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation.

When the polymerizing light from the collimated light sources 300 are used concurrently the waveguides are formed concurrently. As a result, the intersections of waveguides will not exhibit a discontinuity in the waveguide caused by the difference in index of refraction between the uncured polymer and the polymerized waveguide. If the waveguides are formed serially then light in a later formed waveguide will encounter a change in index of refraction when the light hits a previously formed waveguide. The result will be a discontinuity in the waveguide. By contrast, concurrent formation of the waveguides results in the polymerizing light encountering substantially the same index of refraction throughout the waveguide formation process. The result with concurrent waveguide formation is the intersections 18 of waveguides being unperturbed by changes in index of refraction during the waveguide formation process.

The spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed three-dimensional ordered microstructure (or the formed polymer microtruss structure). Without implying a limitation, the aperture spacing is on the order of 0.01 mm to 1.0 mm.

Through the system of FIG. 3, a three-dimensional ordered microstructure of an embodiment of the present invention can be designed for a given application. The design parameters include: 1) the angle and pattern of the polymer waveguides with respect to one another, 2) the relative density of the resulting cellular structure (or the open volume fraction), and 3) the cross-sectional shape and dimensions of the polymer waveguides. Here, in one embodiment, the waveguide (or truss) diameter can range from 10 microns to 5 mm depending on the design criteria. The length of the waveguide between waveguide nodes of interpenetrating waveguides can be between 5 and 15 times the diameter. In addition, the number of nodes, or the number of repeating unit cells, through the thickness can be chosen or varied with the design requirments. Typical microtruss 10 structures can have one-half unit cell to five unit cells through the thickness. Moreover, due to the method of formation of the three-dimensional ordered microstructure (or the open-cellular polymer microtruss structure) according to an embodiment of the present invention and as described in following method shown in FIG. 5, the propagation distances and/or the nodes of the interpenetrating waveguides are unperturbed by the change in index of refraction caused by polymerization.

When the portion of the collimated light beam passes through the mask 330 and first hits the liquid photo-monomer 320, a polymer "tip" is formed. There is a large enough difference between the refractive index of the monomer and the polymer to cause internal reflection of the light in the polymer—this is the same principle as when light travels through fiber optics. Because of this internal reflection effect, the light is essentially focused to the tip of the polymer, causing the monomer at the tip to cure (i.e. polymerize). This will also propagate the tip of the polymer through the liquid monomer 320, forming the self-propagating polymer optical waveguide 360. In addition, because of this internal reflection affect, the waveguide 360 can be "very" long with respect to the cross-sectional dimensions, all while maintaining a substantially constant cross-section through its length. Eventually the formation of the polymer waveguide 360 will stop at the end of the monomer reservoir 310, or it will stop prior to that if there is not enough energy to polymerize the monomer 320. This happens because the polymer itself will absorb some of the portion of the collimated light beam passing through the mask 330.

In forming a 3D polymer structure, a mold with an open top is filled with a monomer that will polymerize in the UV regime. The depth of this mold cavity is approximately 6 mm and may be filled with a commercial photo-monomer. This commercial photo-monomer polymerizes via free-radical polymerization when exposed to UV light (wavelength between 250-400 nm), and is highly transmissive to light in this wavelength range—a property required for the formation of polymer waveguides. Non-limiting examples of the photo-monomer include any suitable free-radical photopolymer materials, such as urethanes (polyurethanes), acrylates, methacrylates, cationic polymers, and photo-cured epoxies.

The dimensions of a microtruss structure are limited in depth ("y" in FIG. 2) by the ability of the light to polymerize the liquid photo-monomer. Length and width are not so limited because larger molds may be used to form the waveguides. Furthermore, by layering thicknesses of polymerized microtruss material, an overall microtruss material with a thickness greater than approximately 1 cm may be achieved.

Multiple layers 17 and 19 of the three-dimensional ordered microstructure shown in FIG. 2 may be formed concurrently with the correct design of the mask and use of the collimated lights. Alternatively, layers may be built up by stacking and attaching layers 17 and 19 to achieve a desired thickness. The layers 17 and 19 may have an interface layer between them or the layers may simply be stacked, either with trusses aligned or not, although preferably aligned to maximize the heat transfer through the Heat Exchanger. The layers may be attached to each other by welding, brazing, soldering, using adhesive or other ways well known in the art once removed from the monomer.

With reference back to FIGS. 1 and 2, the truss elements 12, 13, 14, and optionally 16 of the three-dimensional ordered microstructure (microstructure) 10 define an open volume (i.e. free space) of the microstructure 10. In one embodiment, the microstructure 10 defines a free space of not less than about 40% by volume and not greater than about 99% by volume. In another embodiment, the microstructure 10 defines a free space of not less than about 70% by volume and not greater than about 95% by volume. Free space is defined as the volume of a rectangular cell with vertices defined by the ends of the truss, less the volume of the truss elements, divided by the volume of the rectangular cell. Free space is synonymous with porosity.

The truss elements 12, 13, 14, and optionally 16 intersect at the nodes 18 to form symmetrical angles in three dimensions (three orthogonal directions). The symmetrical angles relative to the x-z-plane (see, FIG. 1), can measure between 0° and 90°. That is, truss elements 12, 13, 14, and optionally 16 interpenetrate each other to form "perfect" (i.e. unperturbed) nodes: each of the truss elements 12, 13, 14, and optionally 16 defines an angle relative to a compression surface of the microstructure 10 (e.g. a surface extending along a direction in the x-z plane), and the respective angles defined by the truss elements 12, 13, 14, and optionally 16 are substantially equal to one another. That is, in one embodiment, these nodes are unperturbed by changes in index of refraction caused by photopolymerization due to their formation as described with respect to FIGS. 5A through 5E. However, embodiments of the present invention are not limited thereto.

In one embodiment, each of the truss elements 12, 13, 14, and optionally 16 has a diameter of not greater than about 500 μm. Preferred dimensions of the truss are a diameter between 10 μm and 1 mm and a length between 100 μm and 10 mm.

In another embodiment, each of the truss elements 12, 13, 14, and optionally 16 has a diameter of not greater than about 200 μm. In another embodiment, each of the truss elements 12, 13, 14, and optionally 16 has a diameter of not greater than about 1 μm. The truss elements 12, 13, 14, and optionally 16 are configured to have a correspondingly small aspect ratio (e.g., length/diameter ratio) for withstanding a bending moment. Here, each of the truss elements 12, 13, 14, and optionally 16 has a length not greater than 100 μm such that the truss elements can better withstand a mechanical load applied to the microstructure 10. As such, the truss elements 12, 13, 14, and optionally 16 experience little, if any, bending deformation during application of the mechanical load to the microstructure 10.

At certain dimensions (e.g., the dimensions described above), the strength of the truss elements is increased, which corresponds to an increased strength of the microstructure 10. In one embodiment, each of the truss elements 12, 13, 14, and optionally 16 has molecular alignment extending along an axial direction of the truss element. As such, an anisotropic material is produced, which provides a substantial degree of stiffness and/or strength along the axial direction. In one embodiment, in a material that is composed of long molecular chains (e.g., polymers), the molecules thereof can be aligned along a direction to provide an increased degree of mechanical strength and/or stiffness along the alignment direction. Where the molecular alignments of the truss elements 12, 13, 14, and optionally 16 extend along the corresponding axial directions, the truss elements 12, 13, 14, and optionally 16 are configured to axially transfer a mechanical load applied to the microstructure 10.

The microstructure 10 withstands a mechanical load through axial tension and compression of the truss elements 12, 13, 14 and optionally, 16. Molecular alignment of the truss elements 12, 13, 14, and optionally 16 along their respective axial directions lends additional strength and/or stiffness to the truss elements 12, 13, 14, and optionally 16 and, accordingly, also to the microstructure 10. Structural strength is improved by having interpenetrating truss elements 12, 13, 14, and optionally 16 intersect at 18.

In one embodiment, the truss elements 12, 13, 14, and optionally 16 are configured to provide the microstructure 10 with a stretch-dominated behavior under a compression load applied to the microstructure 10. Such stretch-dominated behavior is contrasted from the bending-dominated behavior (e.g. of randomly oriented cellular structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\rho_s'$, where $\rho'$ is the density of the cellular material and $\rho_s'$ is the density of the solid from which it is constructed. In contrast, a stretch-dominated structure (such as microstructure 10), has a compressive elastic modulus (E) directly proportional to both the relative density thereof and the modulus ($E_s$) of the solid material portion of the microstructure 10, as expressed in equation (1) below:

$$E = E_s (\sin^4 \theta)(\rho/\rho_s) \quad (1)$$

where $\rho$ is a density of the microstructure 10, $\rho_s$ is a density of a solid material portion of the microstructure 10, $\theta$ is an angle of at least one of the truss elements 12, 13, 14, and optionally 16 relative to a compression surface of the microstructure 10, and $E_s$ is a modulus of the solid material portion of the microstructure 10. As such, the elastic modulus of a structure of embodiments of the present invention is also proportional to a geometric function of the angle $\theta$ of the structure, and $\theta$ can accordingly be chosen to vary (e.g., increase or reduce) the elastic modulus.

With reference back to FIGS. 1 and 2, the microstructure 10 includes truss elements 12, 13, 14, and optionally 16 respectively extending along A, B, Q, and C directions.

However, embodiments of the present invention are not limited thereto. For example, with reference to FIG. 6, a structure of an embodiment of the present invention may include truss elements defined by self-propagating polymer waveguides and extending along D, E, F, G, H, I, J and K directions, respectively. For example, a structure according to an embodiment of the present invention may include eight truss elements, each of which extends along a corresponding one of eight varying directions. Here, similar to the embodiment shown in FIGS. 1 and 2, the eight truss elements interpenetrate each to form nodes of a continuous material with a three-dimensional microstructure order. However, embodiments of the present invention are not limited thereto, and may include more or fewer than eight truss elements.

Figure 8:
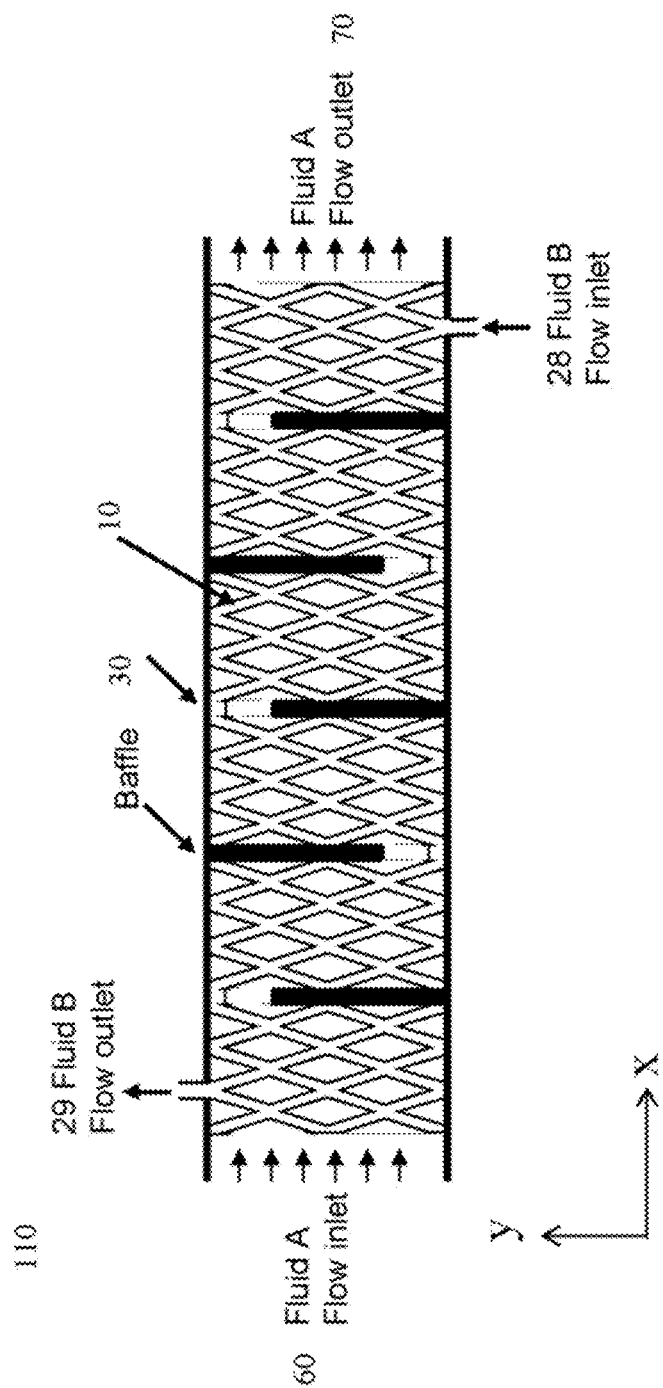
FIG. 8 illustrates an alternative embodiment of a Heat Exchanger using microtruss material and baffles.
Figure 9:
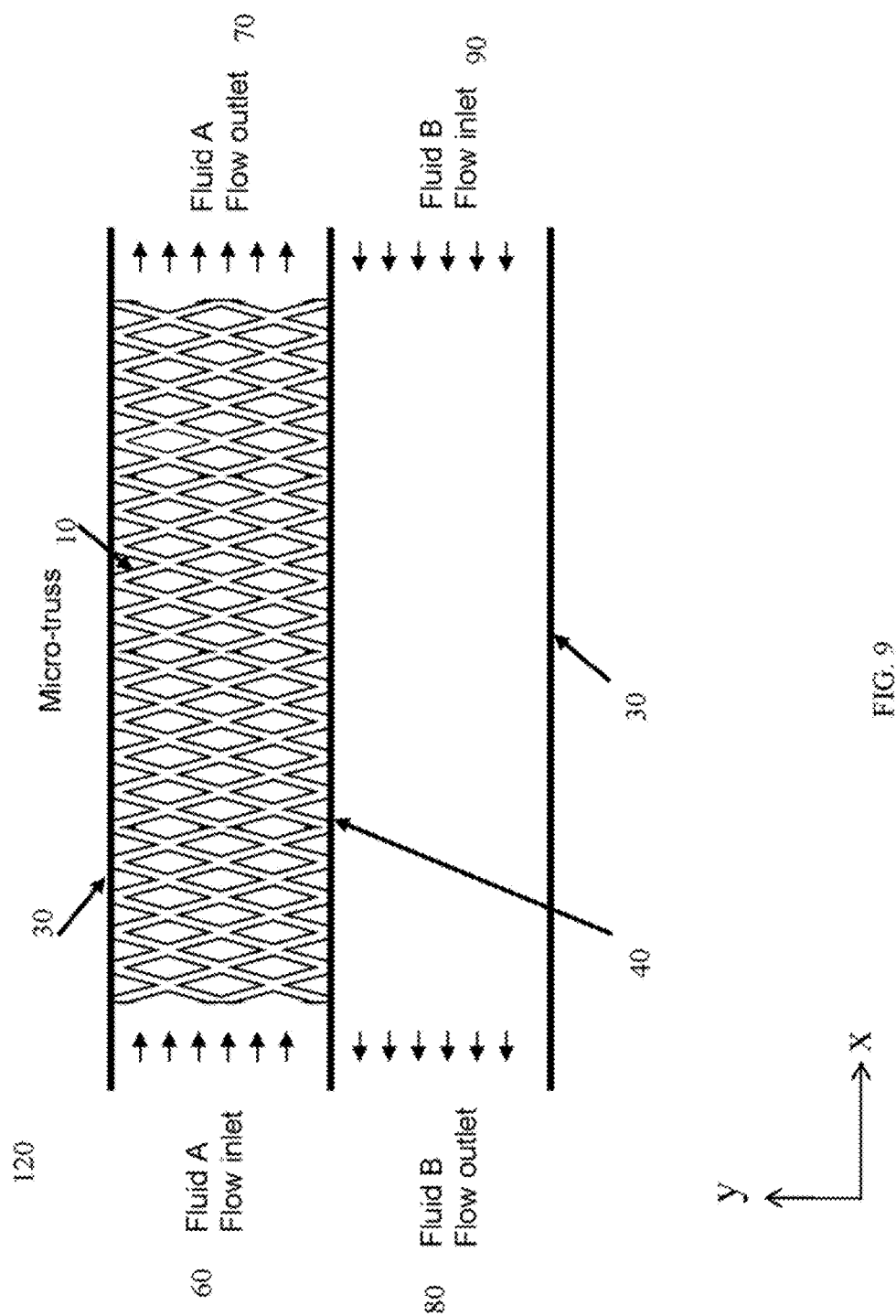
FIG. 9 illustrates an embodiment of a Heat Exchanger using microtruss material capable of supporting a load where the two fluid flows are kept separate by additional structure rather than the microtruss material.
Figure 10:
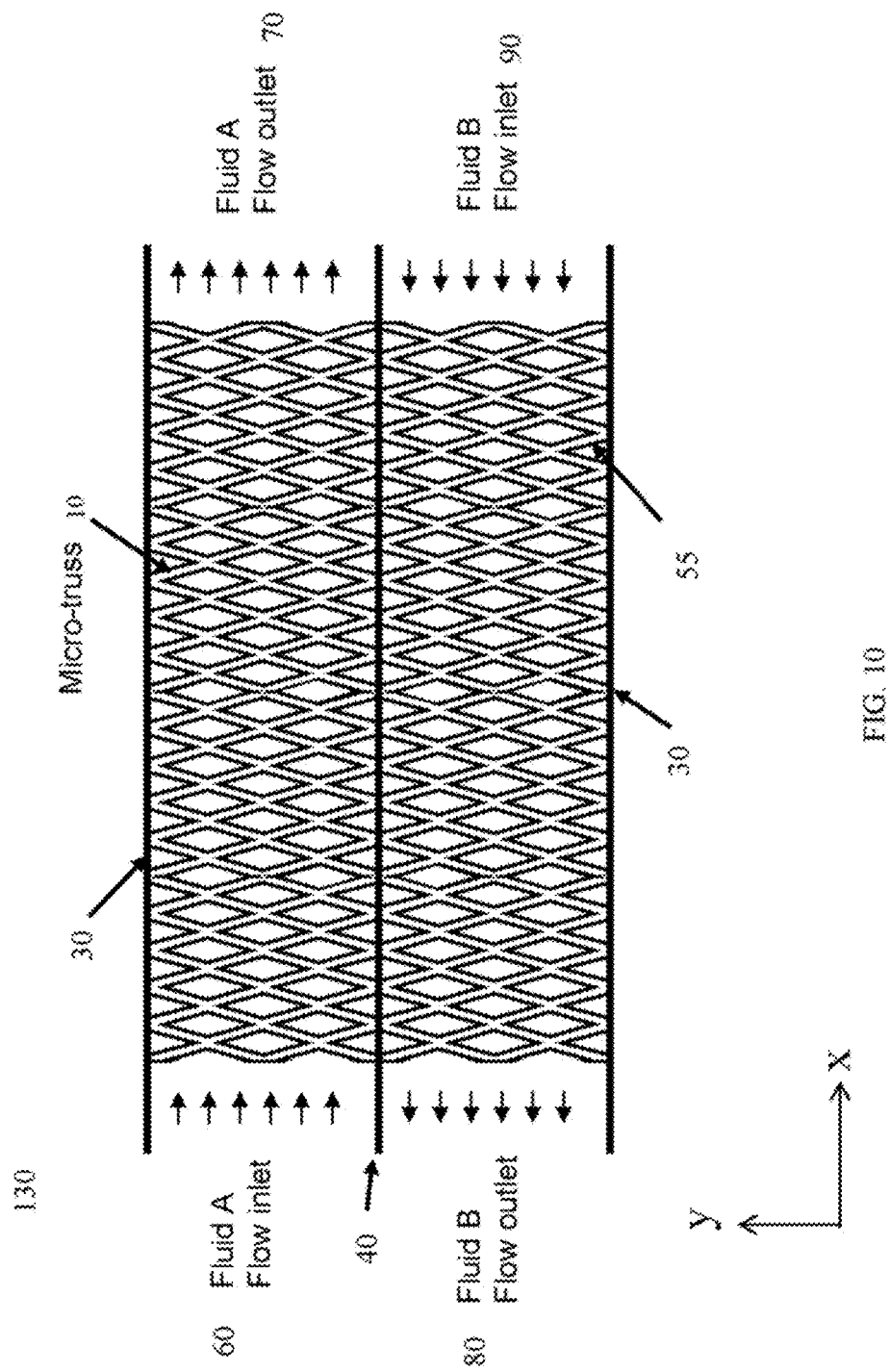
FIG. 10 illustrates an embodiment of a Heat Exchanger using microtruss where both fluid flows are in contact with one or more sections of microtruss material.

FIGS. 5A through 5E shows a method of forming a Heat Exchanger comprising a three-dimensional ordered microstructure (or an polymer microtruss structure) according to an embodiment of the present invention. As illustrated in the overview in FIG. 5A, the Heat Exchanger is built around the microtruss material produced in step 510. Next, hollow microtruss elements may be formed through one of two alternate processes 530 and 550. Optionally, wires may be added to the microtruss material to support ElectroHydro-Dynamic (EHD) fluids. Depending on the application, the hollow truss elements may be filled as shown in step 580 with a thermally conductive material. Finally, the microtruss material is assembled with an outer shell, input ports, output ports, and optional baffles to complete the Heat Exchanger. FIGS. 8, 9 and 10 show various options for the shell and the separation of one fluid from another.

Figure 5A:
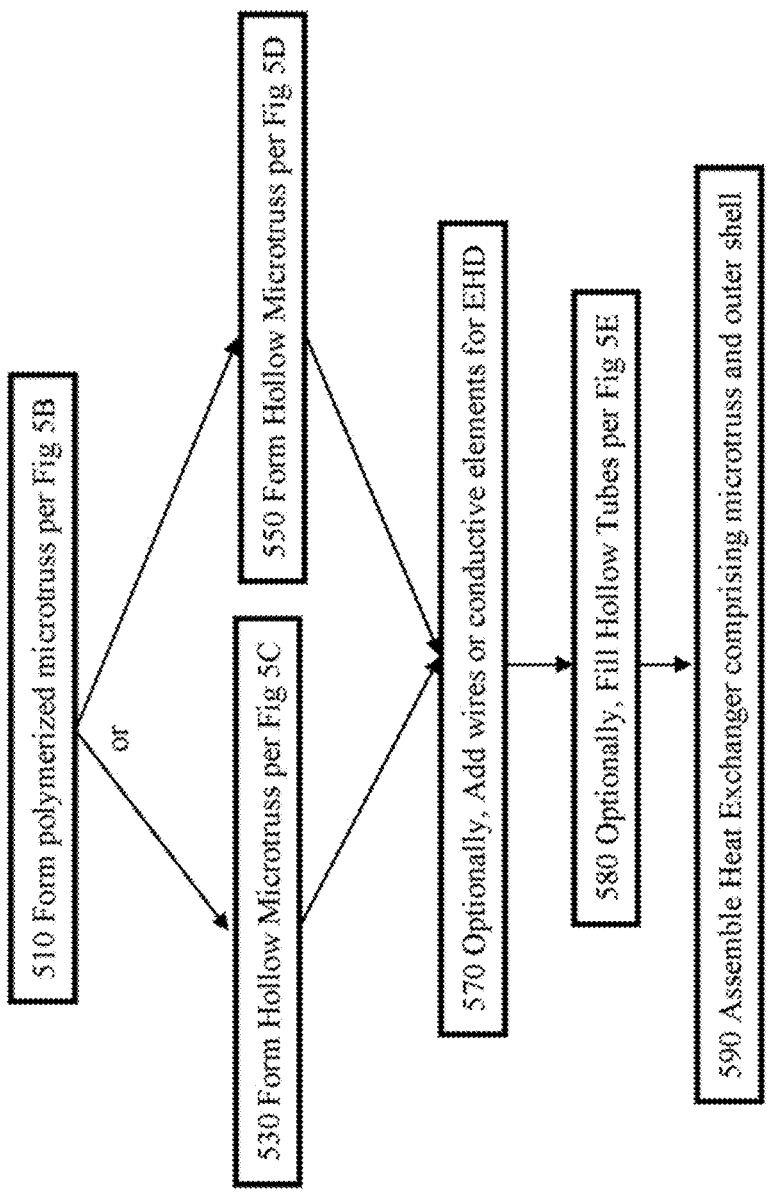
Figure 5B:
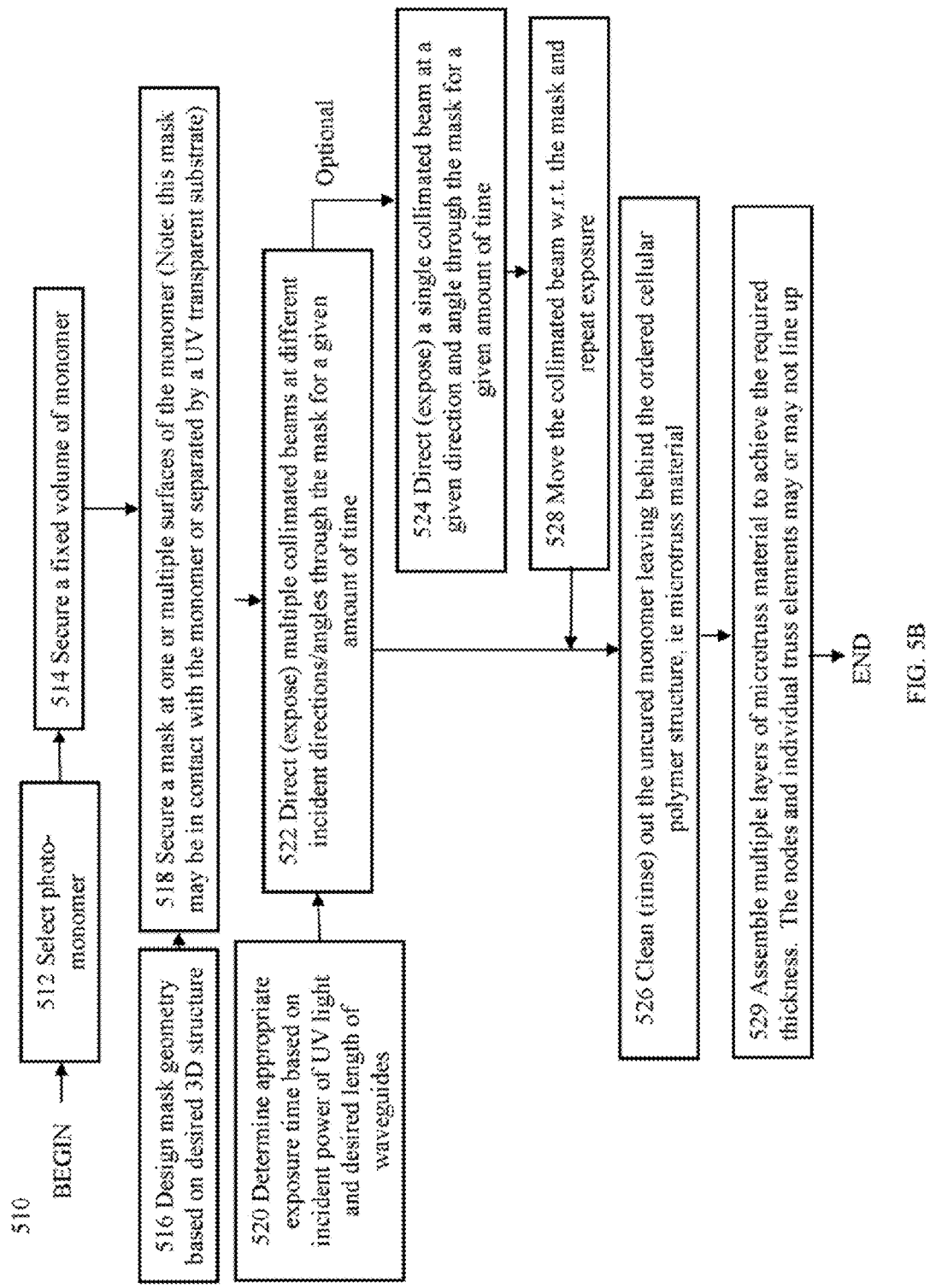

The microtruss material is created as illustrated in FIG. 5B. A photo-monomer is selected in block 512. Non-limiting examples of the photo-monomer include any suitable free-radical photopolymer materials, such as urethanes (polyurethanes), acrylates, methacrylates, cationic polymers, and photo-cured epoxies. In block 514, a volume of the selected photo-monomer is secured (e.g., in a reservoir). A mask geometry is designed based on a desired three-dimensional structure in block 516. The mask 330 and the lights 300 define the truss element angles, number of truss elements, internodal spacing and the shape of the truss elements. A patterning apparatus, such as a mask 330 having the designed geometry determined in step 516, is secured in block 518. Here, the secured mask 330 has at least one aperture 340 between at least one collimated light source 300 and the volume of the selected photo-monomer 320. In addition, the mask may be in contact with the monomer or separated by a substrate (e.g., by a UV transparent substrate).

In block 520, an appropriate exposure time is determined based on incident power of a collimated light beam from the at least one collimated light source (e.g., an incident power of a UV light), a desired length of one or more waveguides, whether a single layer or multilayer spatially graded structure will be formed, and whether the layers interpenetrate or not. The collimated light beam from the at least one collimated light source is directed to the mask 330 for a period of exposure time so that a portion of the collimated beam passes through the mask 330 and is guided by the at least one aperture into the photo-monomer to form at least one waveguide through a portion of the volume of the photo-monomer. Here, the at least one waveguide has a cross-sectional geometry substantially matching the designed aperture 340 geometry on the mask 330.

In one embodiment as shown in block 522, multiple collimated beams at different incident directions and/or angles are directed through the mask 330 for a given amount of time to form the microtruss material 10. This formation may require multiple masks 330 of different characteristics; placing the structure from step 526 in another mold, adding monomer 320, using the same or different mask 330 and exposure to the collimated light 300. This process may be repeated to build a structure of the required depth and architecture.

Alternatively, as shown in blocks 524, a single collimated beam at a given direction and angle is directed through the mask 330 for a given amount of time. Then, at block 528, the collimated light beam is moved with respect to the mask and the exposure is repeated.

At block 526, any uncured photo-monomer is removed to leave behind a three-dimensional ordered polymer microstructure 10 (or a polymer microtruss structure). Removal may be by using a solvent such as toluene or simply allowing the structure to drain. Here, in one embodiment, the plurality of polymer waveguides are used to form the three-dimensional ordered polymer microstructure 10, and the three-dimensional ordered polymer microstructure 10 corresponds with the pattern of the plurality of apertures 340.

Once the polymer cellular structure is formed in the volume of monomer, the remaining un-polymerized material (monomer) is removed in step 526 of FIG. 5B leaving an open cellular polymer material that is the three-dimensional ordered microstructure 10 (or the polymer microtruss structure). By way of example, a solvent that dissolves the monomer (but not the polymer) may be used to aid in the monomer removal.

The resulting three-dimensional polymer microstructure 10 can be formed in seconds in the area exposed to the incident collimated beam. Since the incident light and the monomer remain fixed with respect to one another during the formation of a polymer waveguide, the exposure area of the collimated beam(s) can be scanned over a larger surface area of monomer, leading to the formation of large-area structures in the x-z plane. Alternatively, in one embodiment, a volume of monomer can continuously be fed under a fixed incident light pattern (created from a mask and collimated light) leading to a path for mass production.

Finally, layers of microtruss material may be layered to achieve the required thickness as shown in 529 of FIG. 5B. The nodes at the interface between layers may or may not line up. Multiple layers of the structure may be held together with adhesives or by wetting the interface between layers with the same monomer used to form the microtruss material 10 and curing the monomer by exposure to heat or light.

As such, through the system of FIG. 3, a three-dimensional ordered microstructure of an embodiment of the present invention can be designed for a given application. The design parameters include: 1) the angle and pattern of the polymer waveguides with respect to one another, 2) the relative density of the resulting cellular structure (or the open volume fraction), and 3) the cross-sectional shape and dimensions of the polymer waveguides.

The microstructure of FIG. 2 may be built to accommodate an irregular surface by adding a blank or die to the mold of the microtruss forming machine 300 to terminate the formation of the truss members such that they conform to an irregular surface.

The polymer cellular structure formed at this point comprises one or more layers 17 and 19 of truss elements as shown in FIG. 2 but is not necessarily a good Heat Exchanger. The microstructure may have its thermal conductivity improved in subsequent steps by plating the microtrusses with a metal or ceramic or by replacing the polymer microtrusses with a thermally conductive metal or ceramic while preserving the microstructure architecture as shown in steps 530 and 550. Various methods are known in the art for plating the microstructure such as chemical vapor infiltration.

Figure 5C:
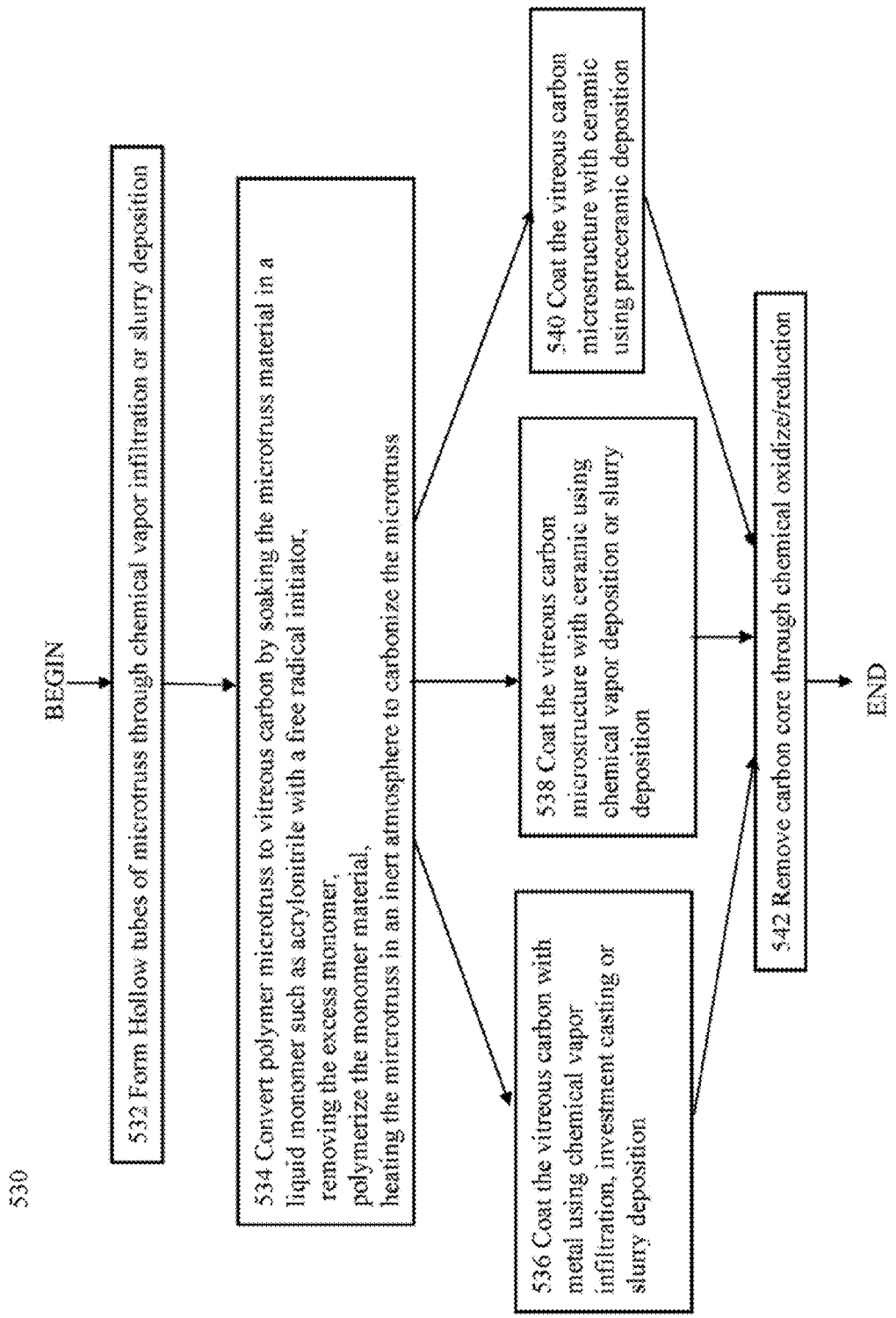

As shown in FIG. 5C, hollow truss elements may be formed by starting with the solid photo-polymerized microstructure 10 from step 510 of FIG. 5B as described in U.S. Pat. No. 7,382,959 OPTICALLY ORIENTED THREE DIMENSIONAL POLYMER MICROSTRUCTURES issued Jun. 3, 2008 and incorporated by reference in its entirety, then converting to vitreous carbon as described in U.S. patent application Ser. No. 11/870,379 ORDERED OPEN-CELLULAR CARBON MICROSTRUCTURE AND METHOD OF MAKING SAME filed Oct. 10, 2007 and incorporated by reference in its entirety. Essentially, this method shown in step 534 of FIG. 5C adds a monomer to the structure, polymerizes the added monomer with ultraviolet light, removes the excess monomer and finally, by heating the microtruss in an inert atmosphere, drives off most everything except the carbon of the microtruss and polymerized monomer. The monomer may be added by soaking the microstructure 10 in the monomer or simply wetting the microstructure as long as the monomer is absorbed. This may be accompanied by the microstructure swelling with the added monomer. Note the monomer in this step is not necessarily the same as the monomer used to create the microstructure itself. A nonlimiting example of such high carbon yield monomer is acrylonitrile.

Next, covering the exterior of the trusses with a material, without implying a limitation, through electroplating, investment casting or chemical vapor infiltration (steps 536, 538 and 540) and finally removing the carbon core material through oxidation or comparable process in step 542. The resulting truss elements are hollow and a fluid can move, for example, from truss element 12 to truss elements 14 or 16 through the node 18.

Figure 5D:
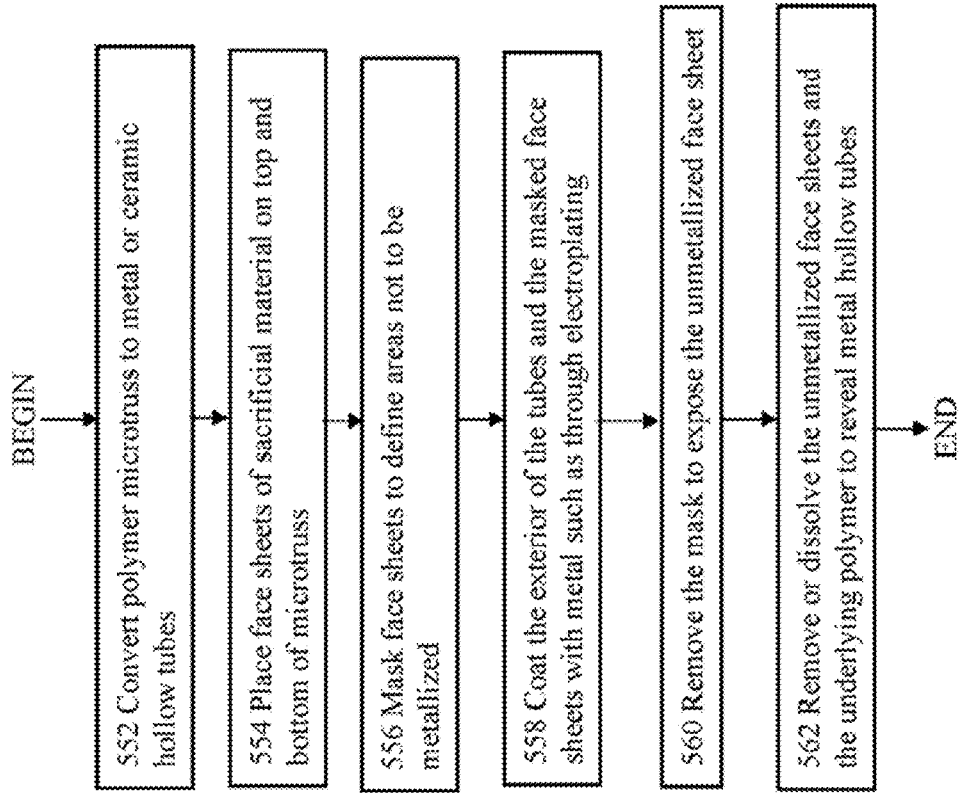

An alternative process to that shown in FIG. 5C is shown in FIG. 5D. FIG. 5D shows a process for manufacturing hollow truss elements that consists of forming the polymer truss elements as above in step 510, placing face sheets on the top and bottom of the microtruss structure, masking the exterior of the face sheets, and coating the resulting structure with metal. Coating may be, for example, by electroplating, chemical vapor deposition or electrodeposition. The external mask is removed from the face sheets, then removing portions of the face sheets as defined by the external mask, and dissolving the underlying polymer to reveal the hollow tubes.

Optionally, the hollow truss elements from the process in FIG. 5C or 5D may be filled as shown in FIG. 5E. As shown in FIG. 5E, solid truss elements of metal or other non polymer material may be formed by plating the polymer truss elements through electroplating, investment casting, chemical vapor deposition (CVD), or chemical vapor infiltration (CVI) as described in steps 530 or 550, removing the polymer material then filling the resulting hollow truss elements with metal or ceramic material. Details of forming the truss elements are given in U.S. patent application Ser. No. 12/074,727, entitled "CERAMIC MICROTRUSS" the entire content of which is incorporated herein by reference. Example truss element materials include polymers, metals (including aluminum, copper, steel, etc.), and ceramics (including alumina, yttria stabilized zirconia (YSZ), silicon carbide (SiC), diamond). While ceramics could be used in these applications, metals are preferred in one embodiment. The resulting microtruss material is then incorporated into a shell of the Heat Exchanger.

Figure 11A:
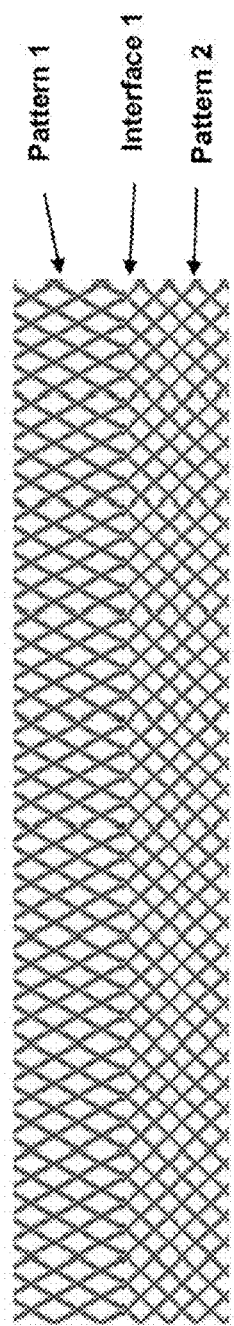
FIG. 11A shows a spatially graded microtruss structure comprising two layers of microtruss material made with different node to node and truss element dimensions.
Figure 11B:
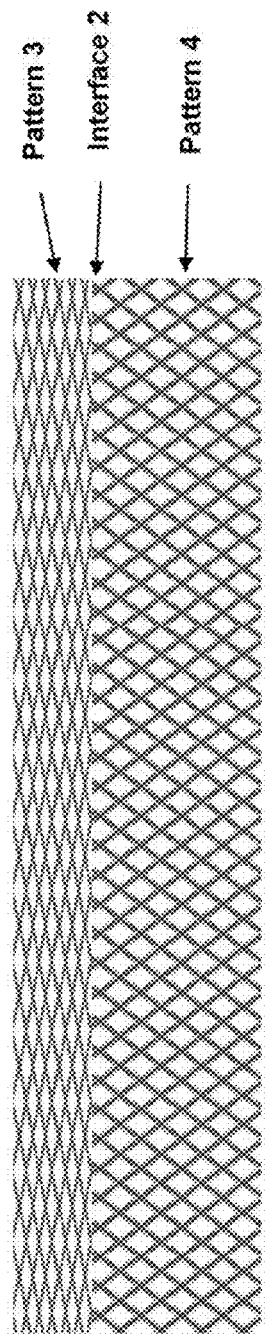
Figure 11C:
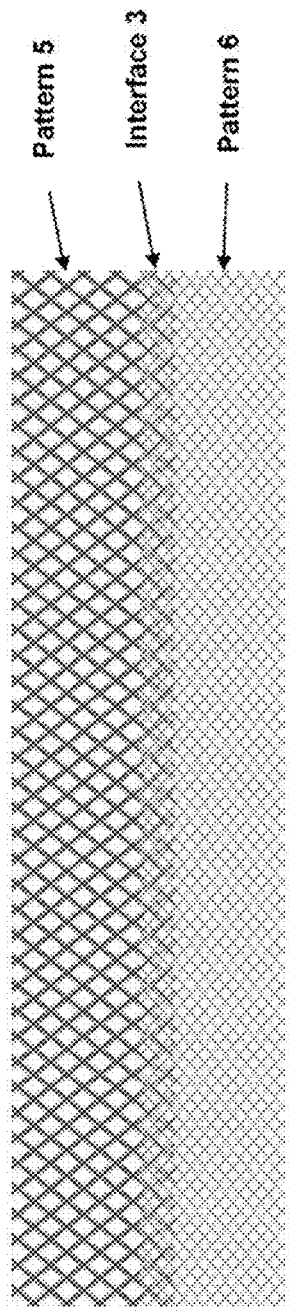
FIG. 11C shows a spatially graded microtruss with layers that interpenetrate.

Embodiments of the present invention provide a set of Heat Exchanger applications comprising three-dimensional ordered microstructure (as described above) and a shell. These are depicted in FIGS. 7, 8, 9 and 10. In embodiments of the present invention, multiple layers of the three-dimensional ordered microstructures are stacked to achieve a desired thicknesses for certain Heat Exchanger applications as shown in FIG. 11A through FIG. 11C.

These Heat Exchangers has been shown by simulation to have a heat transfer coefficient multiplied by the surface area to volume ratio between $3.7*10^7$ to $7*10^9$ Watts per $M^3K$ where K is the temperature in degrees Kelvin. The corresponding figure of merit for the Heat Exchanger's pressure drop across the inlet and outlet is 400 to $10^6$ pascals per meter of length. A typical shell and tube Heat Exchanger has a heat transfer coefficient multiplied by the surface area to volume ratio of $10^4$ to $10^6$ Watts/$M^3K$ and the corresponding pressure drop is $10^{-3}$ to 10 pascals per meter of length.

The three-dimensional ordered microstructures (microtruss) 10 (after conversion to the desired material) are used in Heat Exchanger applications. One implementation is depicted in cross-section in the embodiment shown in FIG. 7. In this Heat Exchanger application 100, fluid stream A passes through pores 24 of the microtruss 10. Fluid B passed through hollow truss elements 22. Heat is conducted from fluid A to fluid B through the walls of the hollow tubes 22. The high surface area to volume ratio of the microtruss structure provides increased heat exchange from fluid A to the fluid B. In addition, it should be apparent to those skilled in the art that the embodiments of FIG. 7 may be adapted to any suitable Heat Exchanger application.

In the embodiments of FIGS. 7, 8, 9 and 10 the surface area to volume ratio of a microtruss with truss radius of 50 microns, truss length of 900 microns, and acute angle of 40 degrees between intersecting truss elements is about 2000 $m^2/m^3$. The open volume fraction (i.e. void fraction or free space) for such a structure is about 0.91.

A higher surface area to volume ratio generally leads to increased heat transfer. In general a microtruss has a surface area to volume ratio between 30 and 30,000 $m^2/m^3$ with a preferred range of 300 to 15,000 $m^2/m^3$. The mechanical members of the three-dimensional ordered microstructure have a size scale or node spacing between 30 µm and 5 mm. The open volume fraction is between 0.1 and 0.9 with 0.4 to 0.6 being most useful for Heat Exchangers. As the dimensions (or size scale) of the structure decrease the overall heat transfer capability of the Heat Exchanger increases because the surface area to volume ratio increases. Increasing the surface area to volume ration increases the heat transfer coefficient and increases the surface area in contact with the fluid A and B flowing from fluid flow inlets 28 and 60 to fluid flow outlets 29 and 70 in FIGS. 7 and 8. Hence there is an advantage to building Heat Exchangers of three-dimensional ordered microstructure material because of the surface area to volume ratio achievable with microtruss material.

FIG. 8 schematically illustrates a Heat Exchanger 110 in cross section comprising a three-dimensional ordered microstructure material 10 with hollow truss elements. As in the device shown in FIG. 7 the Heat Exchanger of FIG. 8 allows a fluid A 60 to pass through the pores of the microstructure 10 while the fluid B 28 passes through the hollow truss elements of the microstructure 10. Baffles may be added to the structure to force fluid A to meander as it passes from one end of the Heat Exchanger to the other. The shell 30 holds the microstructure 10, and accomodates input and output ports.

FIG. 9 schematically illustrates in cross section, a Heat Exchanger 120 for support of a load. As in FIG. 7, fluid A 60 passes through the pores of microtruss material 10 and exit through outlet 70. Fluid B is in a separate compartment of the shell, enters through an input port 90 and exits through the output port 80. The microtruss 10 conducts heat between fluids A and B through conduction. This conduction may be enhanced by forming the truss elements of the microtruss 10 of metal or perceramic. Optionally, hollow truss elements of microtruss may be filled with a fluid to form a heat pipe. Partition 40 in the shell keeps the fluid A and B separate.

FIG. 10 shows in cross section, another embodiment 130 of the Heat Exchanger with separate compartments in the shell for fluids A and B. In this alternative the microtruss structure 10 may be distinct from or identical to microtruss structure 55. If the microtruss structure 10 is distinct from that of 55 then the respective structures may be a mix of solid or hollow, filled with metal or perceramic or acting as a network of heat pipes. If the microstructure 10 is identical to the microstructure 55 then heat may be conveyed from fluid A to fluid B through conduction but also through convection is the microtruss structure 10 is a heat pipe.

The microstructure 10 of the previous embodiments may benefit by varying the spatial characteristics of the microstructure as described in U.S. patent application Ser. No. 12/317,210 filed Dec. 18, 2008 and titled "FUNCTIONALLY-GRADED THREE DIMENSIONAL ORDERED OPEN CELLULAR MICROSTRUCTURE AND METHOD OF MAKING SAME", the contents of which are hereby incorporated by reference. As shown in FIGS. 11A, 11B, and 11C the spatial characteristics such as node 18 spacing, overall truss element length, truss element length between nodes, truss element diameter, and number of layers 17, 19 may all be varied for each layer.

The open-cellular microstructure in FIGS. 11A, 11B, and 11C formed by multiple exposures will exhibit different patterns depending on the incident light angles as well as the mask pattern. By suitably varying these light angles, mask patterns, and number of exposures different microstructures can be formed as seen in Pattern 1 through 6 in FIGS. 11A, 11B, and 11C. By adapting the exposure method of FIG. 3 to allow for exposure from below through a transparent mold 310 and a second mask on the bottom, then multiple exposures of the liquid monomer 320 are possible. Since the waveguides are initially formed at the exposure surface of the monomer and propagate away from this exposure surface, the exposure time and/or incident energy of the light can be suitably varied such that the two distinct microstructures formed at the two exposure surfaces will "connect," or intersect at some interface layer between the two exposure surfaces. As shown in FIG. 11A the Interface 1 may allow for the truss elements to connect; FIG. 11B shows the truss elements at Interface 2 to touch each other but not connect; finally FIG. 11C shows the truss elements at Interface 3 may intermix and may interpenetrate. This interface layer can have a thickness less than the unit cell thickness of either microstructure—i.e. just thick enough to form a physical connection between the two microstructures (as shown in FIGS. 11A and 11B)—or the two microstructures can overlap, creating an interface with its own distinct microstructure and thickness (as shown in FIG. 11C). That is, FIGS. 11A, 11B, and 11C show two dimensional cross sections of three-dimensional functionally graded microstructures that can be formed through the above described technique according to embodiments of the present invention.

Alternatively the microstructure may be built of successive layers by either stacking separately formed layers or by repeated filling of the mold 310 in FIG. 3 with monomer 320 and exposure to the polymerizing light 300.

Given a multilayer spatially varying microstructure as shown in FIGS. 11A, 11B, and 11C, the previous methods for creating hollow truss elements, filling truss elements or plating truss elements may be applied. Note that if the spatially varying microstructure is plated after multiple layers are formed then a single piece microstructure may have truss element dimensions and nodal spacing that vary with the layer. Furthermore, these truss elements may be hollow or filled. If hollow, then the smaller truss elements may be used for a liquid phase fluid and the larger diameter truss elements may be used for the gaseous phase fluid. Such embodiments with small and large truss elements may form heat pipes. The performance of the heat pipes may be enhanced further by using changing the asperity of the truss elements at the interface of the gas and liquid phases.

One advantage of controlling the surface roughness or asperity of the truss elements in a microstructure 10 at the interface is that an increased surface roughness results in a decrease in boiling point, an increase in condensation temperature, and an ability to maintain nucleate boiling in the presence of high heat fluxes.

In another alternative microstructure 10, different layers may be composed of conducting and non conducting material such that a voltage applied to two conductive layers of the structure separated by a non-conductive layer will create an electric field in the microstructure 10. An electric field in the microstructure 10 will allow or facilitate ElectroHydroDynamic (EHD) stirring of fluids resulting in an increase in the heat transfer coefficient.

In view of the foregoing and according to embodiments of the present invention, micro-structured ordered open cellular materials can be utilized for various suitable Heat Exchanger applications, such as electronics cooling.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A method of exchanging heat between two fluids, the method comprising:
   receiving a first fluid in a first input port of a heat exchanger device and receiving a second fluid in a second input port of the heat exchanger device;
   wherein the heat exchanger device comprises a three-dimensional ordered microstructure material and a shell;
   wherein said three dimensional ordered microstructure material further comprises a plurality of truss elements intersecting at a plurality of nodes to form a continuous material,
   wherein said truss elements comprise; a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction;

wherein the three-dimensional ordered microstructure material has a node to node spacing between 10 micrometers and 5 millimeters; and said plurality of truss elements having a diameter between 1 micrometer and 5 millimeters.

2. The method of claim 1 wherein the heat exchanger device has a heat transfer coefficient multiplied by the surface area to volume ratio between $3.7*10^7$ and $7*10^9$ Watts per $M^3K$.

3. The method of claim 1 wherein the three-dimensional ordered microstructure material has a surface area to volume ratio between about 300 and 15000 $m^2/m^3$.

4. The method of claim 1 wherein the three-dimensional ordered microstructure material has an open volume fraction between about 0.4 and 0.6.

5. The method of claim 1, wherein the three-dimensional ordered microstructure material is comprised of a plurality of layers.

6. The method of claim 5, wherein the plurality of layers have different open volume fractions.

\* \* \* \* \*